(12) United States Patent
Eilers

(10) Patent No.: US 7,610,713 B1
(45) Date of Patent: Nov. 3, 2009

(54) DECOY FIN

(76) Inventor: Thomas A. Eilers, 10726 67th Pl., Clear Lake, MN (US) 55319

( * ) Notice: Subject to any disclaimer, the term of this patent is extended or adjusted under 35 U.S.C. 154(b) by 443 days.

(21) Appl. No.: 11/279,085

(22) Filed: Apr. 7, 2006

Related U.S. Application Data

(60) Provisional application No. 60/669,569, filed on Apr. 7, 2005.

(51) Int. Cl.
*A01M 31/06* (2006.01)
*A01K 91/00* (2006.01)

(52) U.S. Cl. ............................................. 43/3; 43/43.13

(58) Field of Classification Search .................. 43/3, 43/43.13
See application file for complete search history.

(56) References Cited

U.S. PATENT DOCUMENTS

| | | | |
|---|---|---|---|
| 2,413,418 A | 12/1946 | Rulison | |
| 2,637,134 A | 5/1953 | Davidson | |
| 2,726,475 A | 12/1955 | Wiselka | |
| 2,799,960 A | 7/1957 | Riley | |
| 2,945,317 A * | 7/1960 | Wittmann, Jr. | 43/42.5 |
| 3,153,298 A | 10/1964 | Lemon | |
| 3,656,253 A | 4/1972 | Gaunt | |
| 3,673,727 A * | 7/1972 | Bauer | 43/42.5 |
| 4,139,962 A * | 2/1979 | Gardyszewski | 43/42.5 |
| 4,201,006 A | 5/1980 | Wetherald | |
| 4,479,323 A * | 10/1984 | Burr | 43/42.5 |
| 5,074,071 A | 12/1991 | Dunne | |
| 5,101,592 A * | 4/1992 | Merritt | 43/43.13 |
| 5,165,196 A | 11/1992 | Spickelmire | |
| 5,355,615 A | 10/1994 | Spickelmire | |
| 5,822,907 A * | 10/1998 | Lukey | 43/3 |
| 5,829,184 A | 11/1998 | Studanski | |
| 5,970,648 A * | 10/1999 | DeRose | 43/42.33 |
| 6,108,964 A * | 8/2000 | Noorlander | 43/42.5 |
| 6,279,260 B1 * | 8/2001 | Farr et al. | 43/43.12 |
| 6,463,690 B1 | 10/2002 | Wood et al. | |
| 6,601,333 B2 | 8/2003 | Cicoff et al. | |

OTHER PUBLICATIONS

*Funk & Wagnalls Standard College Dictionary*, Harcourt, Brace & World, Inc., NY, 1963, pp. 622, 934 (Definitions of "obtuse angle" and "helical").

\* cited by examiner

*Primary Examiner*—Kimberly S Smith
(74) *Attorney, Agent, or Firm*—Albert W. Watkins

(57) ABSTRACT

A decoy fin has a unitary body divided into at least three generally planar sections. These sections combine to form a generally helical surface which, when submerged in fluid moving relative thereto, will generate cyclical oscillatory movement. In one manifestation, the decoy fin is coupled through one tether line to an avian decoy such as a duck or goose decoy, and is coupled through a second tether line to an anchor. Consequently, when the combination anchor, decoy fin, decoy and tether lines are immersed in moving water, such as a stream or river, the decoy fin is operative to move the decoy therewith through an oscillatory pattern. The decoy fin is adaptable to application to a number of different types and sizes of avian decoys, and may also be readily adapted for use with fishing lures or for other decoys.

12 Claims, 3 Drawing Sheets

DECOY FIN

CROSS REFERENCE TO RELATED APPLICATIONS

This application claims priority to U.S. provisional patent application Ser. No. 60/669,569 filed Apr. 7, 2005 of the same title and inventorship, the contents which are incorporated herein by reference in entirety.

BACKGROUND OF THE INVENTION

1. Field of the Invention

This invention pertains generally to the field of fishing, trapping, and vermin destroying, and in a first manifestation more particularly to duck decoys. In a second alternative manifestation, the invention pertains also to line-guiding vanes shaped or arranged to react with the water upon relative motion thereto to guide or control the line.

2. Description of the Related Art

To the origins of man, there are several essential needs that have been required. Among these is the need for food. This basic need is thought to have originally dictated many of man's activities, and has throughout the ages led to many advances and discoveries. These advances been so successful that, in the more advanced nations of the modern world, man is no longer restricted by this basic need, and food is generally plentiful.

Even though food is now available commercially, and the world has become much more complex, there remains in many individuals a desire to fulfill some of the more basic needs. This has led to the development and refinement of various sports, among which are hunting and fishing. While food may be plentiful, there is still much satisfaction to be gained in the sport. In some cases this may simply be a return to one's roots, or a refreshing visit to what times of old involved. In other cases, the combination of time in the relatively unspoiled outdoors and the opportunity to meet one's basic needs combine to provide great satisfaction. In yet other cases, the time away from hectic life in the city and opportunity to socialize in a more private environment provides an excellent change of pace. Regardless of the specific reasons, millions of individuals at least on occasion continue to participate in the sports of hunting and fishing.

In order to get the greatest satisfaction from the sport, and knowing that many people have relatively limited time and opportunity for recreation, an individual will preferably not spend all of their time in pursuit, and will instead have the opportunity to experience the joy and satisfaction of successfully collecting some of the wildlife that they are pursuing. To this end, there have been many developments that are aimed at assisting the hunter or fisherman, and where these developments have proven to be successful, the developments have been quite well received.

Among these, in the field of duck and goose hunting, man has observed over time that ducks and geese are much more likely to land on a body of water which is already occupied by other ducks and geese. Since ducks and geese are able to fly hundreds of miles during the course of a day, they may choose from what may include thousands of bodies of water. Consequently, without any assistance, a hunter who must set up on only a single body of water may all too often find that the ducks and geese pass him by without coming within range.

To encourage the ducks and geese to land on a particular body of water, man has developed a number of different decoys. These decoys, which are designed to attract or lure the ducks and geese, are most frequently designed to be buoyant upon a body of water, to visually resemble the desired ducks and geese, and to be anchored so that they do not undesirably get carried with currents of water and wind away from the location that is chosen by the hunter.

The basic decoy has proven to be so beneficial to the luring of wildlife that there is hardly a goose or duck hunter that will prefer to hunt without decoys. Nevertheless, as hunters have become more sophisticated, there has been thought that these basic decoys may be further improved upon. For exemplary purposes, the quality of the decoy appearance has been improved. Since ducks and geese have excellent eye sight, they may be very far from the decoys to detect the fact that the decoys are not real, if the appearance is not of high quality. More recently, some have recognized that, even with high quality appearance, if the decoy is not moving then ducks and geese may circle at a distance and in the end move on to other waters. As a result, a relatively recent improvement in the industry has been the incorporation of moving parts that cause the decoy to appear animated.

Exemplary of this concept is U.S. Pat. Nos. 2,413,418 by Rulison, entitled "Mechanical decoy", the teachings which are incorporated herein by reference, which describes a duck decoy with manually activated wing motion controlled remotely by a cord going to a device mounted between the decoy and its anchor. 2,799,960 by Riley, entitled "Animated decoy," the teachings which are also incorporated herein by reference, describes a duck decoy having a wind-up device embedded therein to provide motion to the decoy. 5,074,071 by Dunne, entitled "Decoy holder assembly decoy," the teachings which are incorporated herein by reference, describes a device installed between the decoy and the anchor to coordinate the spacing of and prevent entanglement between multiple decoys. 6,463,690 by Wood et al, entitled "Steam jet propelled waterfowl decoy," the teachings which are incorporated herein by reference, describes a decoy that is powered by fuel to move. Finally, 6,601,333 by Cicoff et al, entitled "Remote controlled game decoy and game retriever decoy," the teachings which are also incorporated herein by reference, describes a decoy that is remotely controlled to direct its movement and actions using onboard powered devices.

As may be appreciated, while these animated decoys may substantially improve the realism from a distance, the cost is also substantially greater. In addition to being substantially more expensive than a simple floating decoy, these decoys are much more prone to failure than the simple float. While it may be economical to add one or two of these decoys, a hunter will frequently employ many more decoys than can be animated. Unfortunately, the majority of decoys then remain relatively motionless. In the prior art, there has not been an affordable solution which will permit a hunter to animate all decoys, and yet maintain the relatively random movements that are necessary to accurately resemble a large number of ducks or geese upon a water body.

Animation is beneficial not only in the art of decoys, but also in the fishing industry. While these are two distinct industries, as will be explained herein below the teachings of the present invention may be applied in some instances to the fishing industry as well. In the fishing industry, there has been much animation incorporated into the lures. Exemplary of this broader concept of imparting zigzag motion to an aquatic device is disclosed, for exemplary purposes, in U.S. Pat. No. 5,829,184 by Studanski, entitled "Zigzag aquatic device and method," the teachings which are incorporated herein by reference. This patent describes a device with selectable connection points for the line to the fishing rod, and for weights and hooks or other lures. It has a bistable guidance vane that alternates in position to cause the lure to track in a zigzag pattern. Nevertheless, the Studanski device operates above the surface, and does not disclose or teach the use with a duck decoy. Additional patents illustrate the use of a device to impart oscillatory motion or guiding forces to fishing lures and baits. Exemplary of these devices are U.S. Pat. Nos. 3,153,298 by Lemon; 4,201,006 by Wetherald; 2,637,134 by Davidson; 3,656,253 by Gaunt; 2,726,475 by Wiselka; and 5,165,196 and 5,355,615 by Spickelmire, the teachings of each which are incorporated herein by reference.

SUMMARY OF THE INVENTION

In a first manifestation, the invention is a decoy fin which produces an oscillatory motion when interacting with fluid moving relative thereto. A unitary body has first and second couplings, and first, second and third generally planar fluid interaction surfaces. The first and second generally planar fluid interaction surfaces are angularly offset from each other, and the second and third generally planar fluid interaction surfaces are similarly angularly offset from each other. A first interface defines a generally linear boundary between the first and second generally planar fluid interaction surfaces, and terminates in a first location adjacent an outer edge of the unitary body and at a second location adjacent an outer edge of the unitary body distal thereto. A second interface defines a generally linear boundary between the second and third generally planar fluid interaction surfaces, with the second interface angularly offset from the first interface. The second interface terminates in a first location adjacent an outer edge of the unitary body and at a second location adjacent an outer edge of the unitary body distal thereto. The second interface thereby defines a distance along the second generally planar fluid interaction surface between the first interface first termination and the second interface first termination which is smaller than a distance along the second generally planar fluid interaction surface between first interface second termination and second interface second termination. The first coupling is formed in the first generally planar fluid interaction surface and is located more nearly adjacent to the first interface second termination than the first interface first termination. The second coupling is formed in the third generally planar fluid interaction surface and is located more nearly adjacent to the second interface first termination than the second interface second termination.

In a second manifestation, the invention is, in combination, an anchor, an avian decoy, a submersible decoy fin, a first flaccid member coupling anchor to submersible decoy fin, and a second flaccid member coupling the submersible decoy fin to the decoy. The submersible decoy fin is oscillatory upon interaction with moving water and is operative to cyclically oscillate the decoy relative to anchor during interaction with moving water.

In a third manifestation, the invention is, in combination, an anchor, a decoy, a submersible decoy fin, a first flaccid member coupling anchor to submersible decoy fin, and a second flaccid member coupling the submersible decoy fin to the decoy. The submersible decoy fin is oscillatory upon interaction with moving water and is operative to cyclically oscillate the decoy relative to anchor during interaction with moving water.

OBJECTS OF THE INVENTION

Exemplary embodiments of the present invention solve inadequacies of the prior art by providing a submersible decoy fin that is cyclically oscillatory upon interaction with moving water, and which is then operative to move a decoy coupled therewith through an oscillatory pattern. The decoy fin is adaptable to application to a number of different types and sizes of decoys.

A first object of the invention is to provide a decoy fin that is of relatively simple construction, thereby lowering the cost of fabrication and ultimate purchase price, such that a hunter may reasonably equip each decoy with a decoy fin, if desired. A second object of the invention is to oscillate a decoy relative to an anchor during interaction with moving water. In this way, no additional motive power is required, thereby reducing the complexity and cost. Another object of the present invention is to provide movement within the decoy which resembles that of a living duck or goose swimming upon the surface of the water. A further object of the invention is to use a like geometry for application to fishing lures. Yet another object of the present invention is to enable the foregoing objects using a construction which is compact, durable and readily transported.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
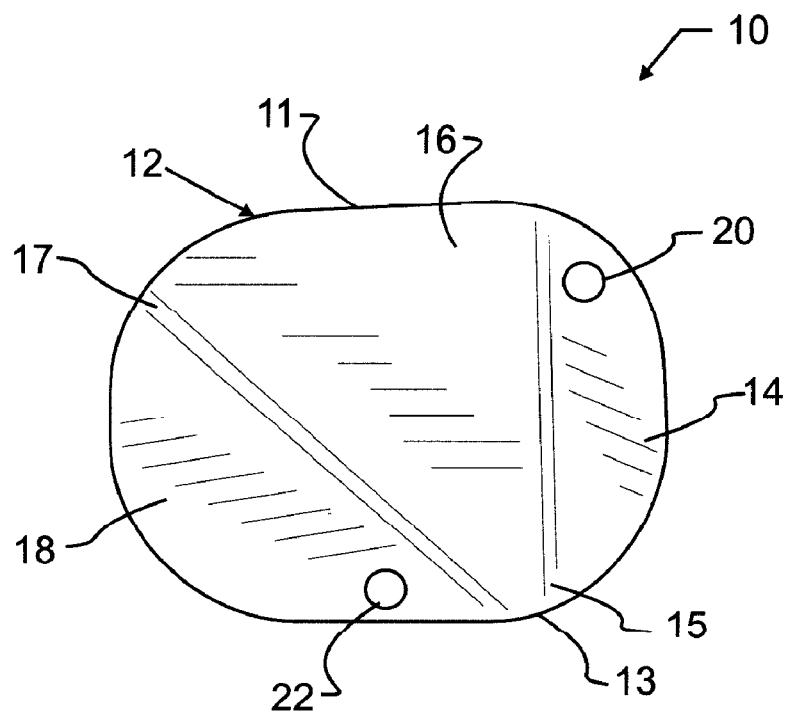
FIG. 1 illustrates a illustrates a preferred embodiment decoy fin designed in accord with the teachings of the invention from front plan view.
Figure 2:
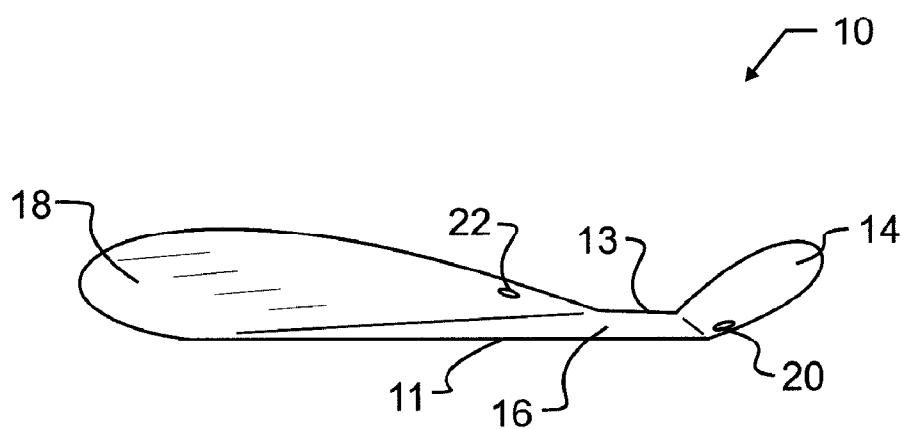
FIG. 2 illustrates the preferred embodiment decoy fin of FIG. 1 from a side, very slightly elevated and therefore projected plan view.

A most preferred embodiment decoy fin 10 designed in accord with the teachings of the present invention is illustrated in FIGS. 1 and 2. Decoy fin 10 has a unitary body 12 which if formed from flat stock would originate as generally rectangular sheet stock with chamfered corners. Unitary body 12 is divided into three generally planar sections 14, 16, and 18. Each planar section 14-18 is, in the preferred embodiment, relatively thin and has much larger surface area than thickness. While not essential to the operation of the invention, this proportion provides for large surfaces of interaction with a moving current of water, while using a relatively small amount of material in the fabrication of decoy fin 10.

Planar section 14 is coupled to planar section 16 at an interface 15 which in the preferred embodiment is generally linear and extends across the full width of unitary body 12. Planar section 18 is coupled to planar section 16 at interface 17, which in the preferred embodiment is also generally linear and extends from edge to edge of unitary body 12. However, as best illustrated in FIG. 1, interface 17 is not parallel to interface 15, and is instead offset therefrom by an approximately 45 degree angle. As a result, planar section 16 forms a general outline resembling a trapezoid, with edge 11 defining the base, interfaces 15 and 17 defining side walls, and edge 13 defining the top. It is contemplated herein that the length of edge 13 could be negligible, in which case planar section 16 would resemble a right triangle having edge 11 as the base, interface 15 defining the height perpendicular to the base, and edge 17 defining the hypotenuse.

Planar section 14 is not co-planar with planar section 16, but is instead angled therefrom, with the transition occurring at interface 15. Likewise, planar section 18 is not co-planar with planar section 16, but is instead also angled therefrom, with the transition occurring at interface 17. As is best illustrated in FIG. 2, this results in an almost spiraling effect, which is important to the operation of decoy fin 10, described herein below.

Into planar section 14 is formed a small hole 20, generally adjacent to edge 11 and interface 15. Into planar section 18 is formed a small hole 22, generally adjacent to edge 13 and interface 17. Holes 20, 22 are used to couple to a flaccid member such as a fishing line, anchor rope, cord or the like. While holes 20, 22 are illustrated in the most preferred embodiment for simplicity of fabrication and coupling, there are a myriad of known hardware and coupling apparatus and methods that are understood to be contemplated herein for use in combination with decoy fin 10 to couple with lines, flaccid cords and other suitable linkages.

Figure 3:
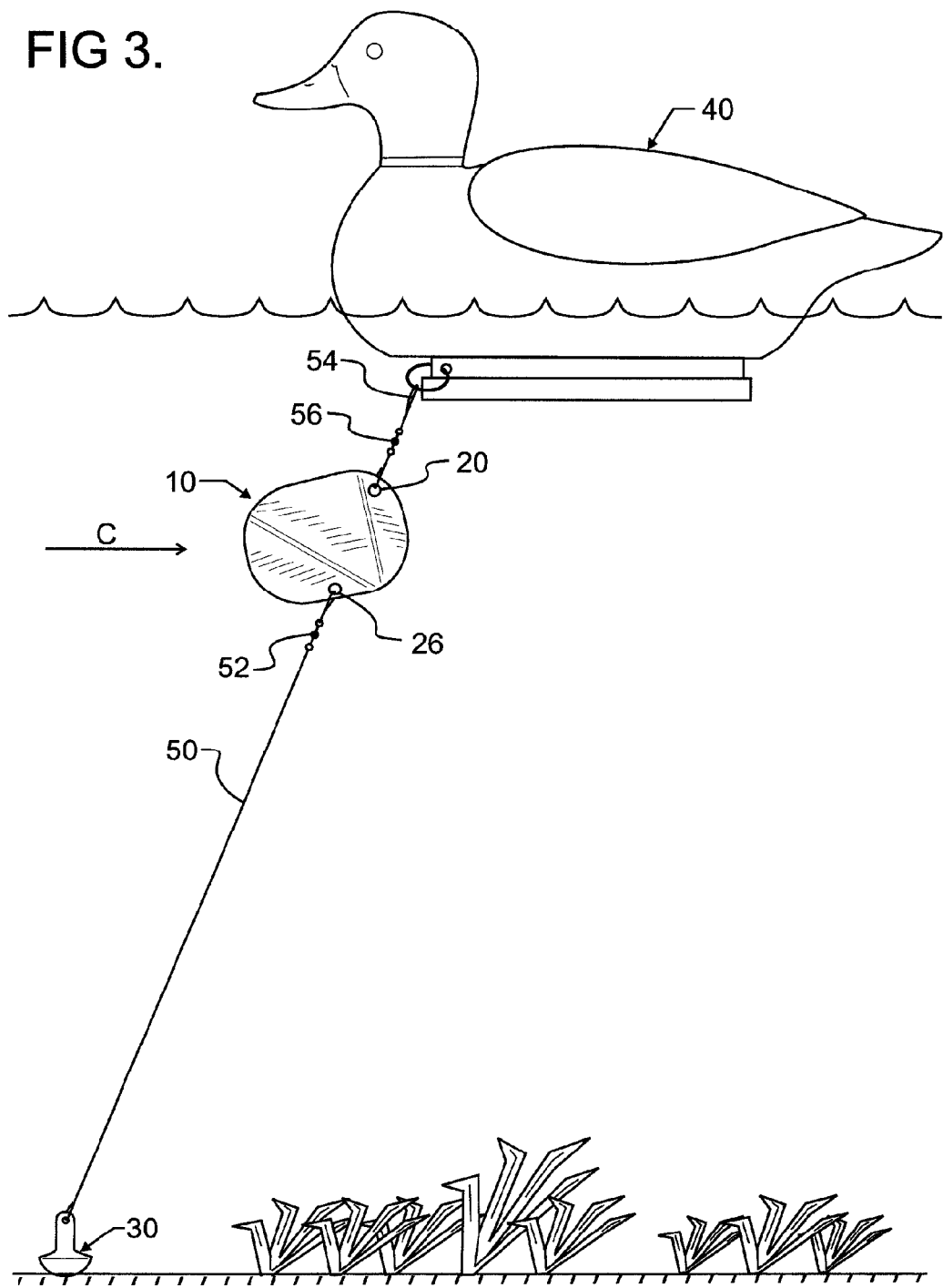
FIG. 3 illustrates the preferred embodiment decoy fin of FIGS. 1 and 2 in a most preferred further combination with a hunting decoy from side plan view.

FIG. 3 illustrates decoy fin 10 in a preferred further combination with a duck decoy 40. As is known in the art, duck decoy 40 is designed with adequate flotation to stay adjacent the surface of a body of water, and thereby resemble a duck at rest in the water. Commonly, such decoys are prevented from drifting about by tethering the decoy to an anchor 30 located at the bottom of the body of water. A flaccid cord or tether line 50 will, in the prior art, be directly coupled between decoy 40 and anchor 30.

Fixed placement of decoys does not, however, resemble actual ducks sufficiently to attract all ducks, since the decoy will stay in a relatively fixed position. Further, when there are multiple decoys placed, which is most preferred, the lack of motion and activity is visually detected by ducks that might otherwise be lured to the decoys.

In order to simulate the motion of living ducks, the preferred combination designed in accord with the present invention and illustrated in FIG. 3 includes decoy fin 10, second tether line 54 and swivels 52, 56 intermediate between duck decoy 40 and anchor 30. Decoy fin 10 is operative through the geometry illustrated and positioning of holes 20, 22 to interact with moving water and will, as a result of such interaction, cause duck decoy 40 to move side to side in moving water, while still facing forward in the direction shown in FIG. 3. Consequently, when a number of decoys 40 are placed in a moving current of water such as a stream, river or the like, each decoy will move side to side in a seemingly random way. Furthermore, the water at the surface interacting with each decoy will vary, depending upon the extent of oscillation of the decoy in the current, thereby further emphasizing the different decoys and their individual movements in the water. Consequently, a duck flying over the water will detect varying movements and positions of the decoys within the water, without necessitating the much more expensive and less reliable motorized decoys of the prior art.

Decoy fin 10, when coupled as illustrated in FIG. 3, will spin within the moving current shown by arrow C, and during such spin, will drive the decoy sideways, such as for exemplary purposes out of the page in FIG. 3. When decoy 40 has moved sufficiently in this first direction perpendicular to the current, the pull of tether lines 50, 54 will angularly orient decoy fin 10 sufficiently with respect to the current that fin 10 will no longer exert a pull on decoy 40. When this point of extreme travel in a first direction is reached, decoy fin 10 stops spinning, and decoy 40 will then be pulled by the current back towards the direction of a point directly downstream from anchor 30 and not offset perpendicular thereto. After reaching the point of extreme travel and then at some point of travel back therefrom perpendicular to the current, decoy fin 10 will once again be oriented to interact with the current, and will again pull decoy 40 perpendicular to the direction of water current. Consequently, decoy 40 will be caused by decoy fin 10 to cyclically oscillate back and forth in a direction primarily perpendicular to the current flow, though the path will also be arcuate owing to the interaction of tether lines 50, 54 and anchor 30 therewith.

This cyclic oscillation will therefore resemble the motion of a pendulum, with repetitive movement back and forth, but with the cycle time varying dependent upon the speed of the current flow, the size of decoy fin 10, and the load produced by the decoy. The speed of the current flow will vary depending upon eddy currents and other localized phenomenon in the water. Similarly, the load produced by the decoy will vary depending upon the instantaneous angle of the decoy in the water, the instantaneous water level which will vary with waves, and air effects such as wind. Consequently, though cyclic, the oscillations will in many cases not be perfectly consistent in cycle time.

While decoy fin 10 is illustrated in a preferred combination specifically with duck decoys, the application will be understood to not be solely limited thereto, and may be applied to any avian or other living species as may be desired. As one example, goose decoys are known which, except for appearance and larger size, function in a manner very similar to decoy 40. For such application, it may be desirable to provide a larger decoy fin 10.

While hunting decoys are most preferably used in combination with decoy fin 10, other applications are also alternatively contemplated herein. Fishing lures will likewise be caused to oscillate when pulled through the water, when a decoy fin 10 is placed on the line ahead of the lure. Other hunting, trapping, and vermin destroying decoys may likewise be coupled with decoy fin 10, where appropriate and desired. In addition, while water is the preferred fluid for application of decoy fin 10, it is also contemplated herein that other fluids may be operative on decoy fin 10, and may therefore include but not be limited to both liquids and gases. Consequently, with appropriate dimension, it is also contemplated herein to produce a decoy fin 10 of appropriate dimension to be operative within a moving air stream. In such case, decoy 40 will preferably be either lighter than air or configured to also be effective within the air stream to elevate or rise therein.

Figure 4:
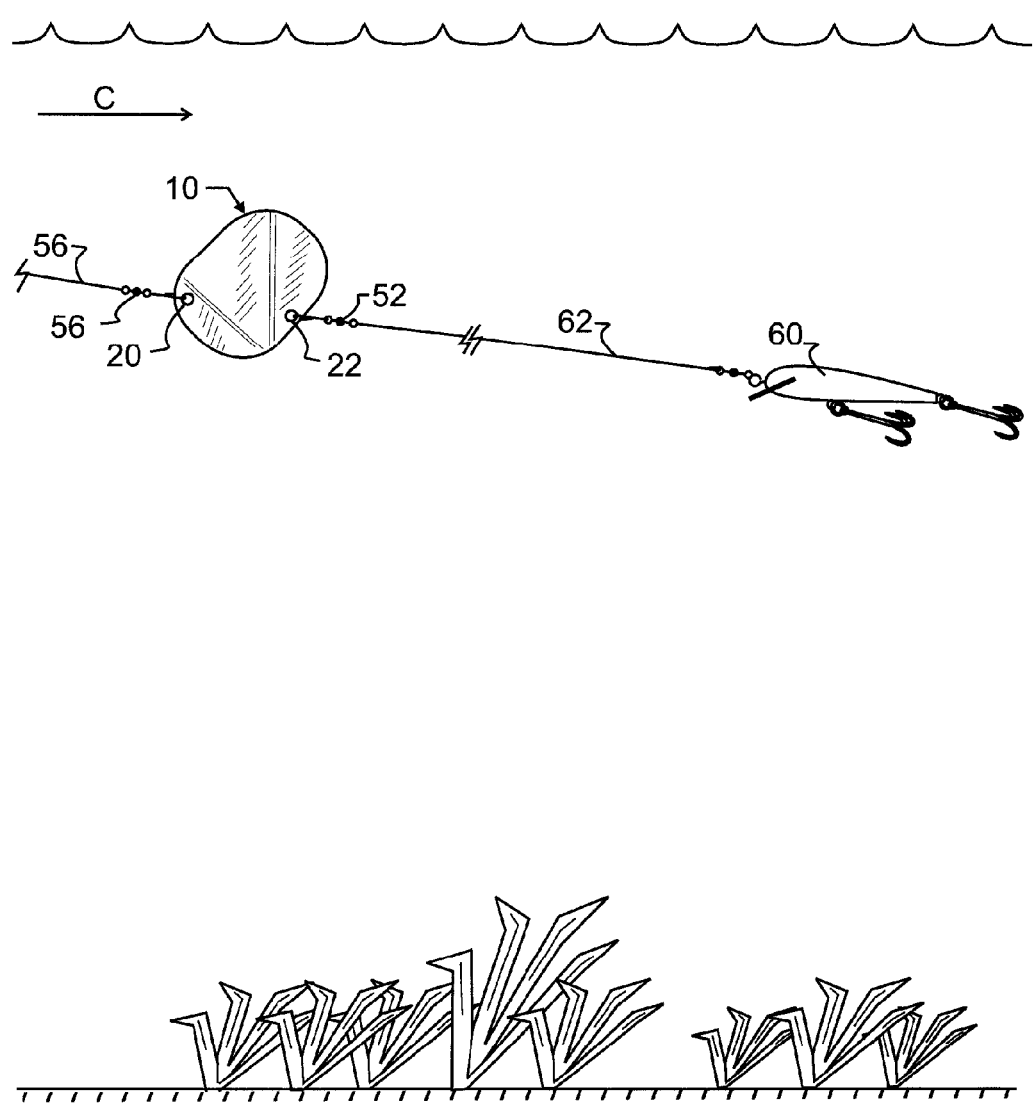
FIG. 4 illustrates the preferred embodiment decoy fin of FIGS. 1 and 2 in an alternative combination with a fishing lure from side plan view.

FIG. 4 illustrates decoy fin 10 in combination with fishing lure 60, and with anchor 30 and anchor tether line 50 replaced by fishing line 62. Operation is the same, and, as should be apparent, any type of fishing lure 60 may be coupled thereto. In addition, while current C is still illustrated in both FIGS. 3 and 4, it will be recognized that for both decoy 40 and lure 60 this designation is one of relative motion between water and decoy fin 10. Consequently, movement may be generated by force applied through fishing line 62, in turn pulling decoy fin 10 and fishing lure 60 through the water and thereby generating relative motion therebetween.

The position of holes 20, 22, the various angular orientations and proportions of size between planar sections 14, 16, and 18, and the angles between interfaces 15 and 17 are known to affect or inhibit the desired oscillation of decoy fin 10 within a current of liquid. Consequently, for a given size of decoy fin 10 and particular decoy intended to be oscillated perpendicular to the current, some reasonable adjustments or variations may be required at the time of design or provided for within decoy fin 10. Consequently, there may be some applications where it is preferred to provide one or more additional holes adjacent to hole 20, typically arranged about the periphery of decoy fin 10. Additional holes may also be provided adjacent to hole 22 as well. Furthermore, decoy fin 10 may be fabricated from a readily deformable material which permits adjustment of the angles between each planar section. However, such added complexity of extra holes and readily deformable materials are not preferred herein, as such may lead to accidental bending or undesirable confusion by those who will be using fin 10. Such adjustment and experimentation will be very minimal or most frequently non-existent where the design and application more closely conforms to the preferred embodiments disclosed herein. In addition, and with adequate experimentation, it may be possible to arrange each of the planar sections 14-18 such that, instead of the helical pattern and helical fluid flow associated therewith, these planar sections may be oriented differently. One conceived variant, while less preferable and only exemplary of the possibilities and so not limiting solely thereto, is to arrange the planar sections such that while planar section 14 extends away from a first planar surface of planar section 16 as illustrated, planar section 18 may be designed to alternatively extend away from the opposed surface of planar section 16.

Decoy fin 10 may be manufactured from a variety of materials, including metals, resins and plastics, ceramics or cementitious materials, or even combinations of the above. The specific material used may vary, though special benefits are attainable if several important factors are taken into consideration. Firstly, decoy fin 10 should be sufficiently light and compact to be easily stored and transported. Most preferably, decoy fin 10 will also be weather and water resistant and sufficiently durable to withstand the particular climate for the intended application. Furthermore, decoy fin 10 must have sufficient structural integrity to withstand any forces that may be applied that would tend to reshape, shear of fracture unitary body 12. Additionally, resistance to abrasion may be preferable in some instances. Finally, coloring and reflectivity will preferably be selected for a given application, most preferably in combination with the material selected.

The materials will most preferably be selected with further consideration for a preferred manufacturing method. For exemplary purposes only, and not limited thereto, decoy fin 10 may be fabricated from a plastic material through the thermal reforming of a sheet of plastic. Vacuum may optionally be applied during the thermal reforming. This method of fabrication permits decoy fin 10 to be produced in relatively large quantity for relatively low up-front tooling and production cost, using the efficiencies found in such manufacturing technique. Injection molding and the myriad of other fabrication techniques are similarly contemplated herein.

For exemplary purposes only, and not limited thereto, decoy fin 10 might be fabricated from a transparent and generally non-reflective material such as a clear plastic when used in combination with duck decoy 40, which would escape visual detection by flying ducks. Translucent materials, or materials with color which camouflages with water might similarly be selected where a designer wishes decoy fin 10 to escape visual detection. In an alternative application, when decoy fin 10 is combined with a fishing lure or the like, a designer may instead wish decoy fin 10 to act as an attractant or flasher, and might then select the material, a coating, or a coloring which is shiny, reflective or otherwise highly visible. Regardless of the material selected, various reinforcing fibers or particles and other ingredients or chemical additives known to enhance the properties, weather resistance, coloring, reflectivity and other properties of the composition and resulting product may be used. Plastics are known which, when properly formulated, have adequate resistance to environment, and are accompanied by the aforementioned low cost and easy manufacture.

A variety of ornamental designs have been contemplated for decoy fin 10. In addition to the shape illustrated herein, various outlines or surface ornamentations may be selected, so long as the proper interaction with water current is maintained. Consequently, various animate or inanimate shapes, outlines or three-dimensional appearances may be integrated with the more functional aspects described herein above. The materials and manufacturing methods used for a particular design may be chosen not only based upon the aforementioned factors such as weather resistance, rigidity, durability, cost and weight, but may also factor in the particular design. For exemplary purposes, when a three-dimensional appearance is preferred, various molding techniques are known such as plastic injection molding and metal casting which may be mandated to produce the desired ornamental appearance. In such case, the materials may also need to be varied in consideration thereof.

While the foregoing details what is felt to be the preferred and additional alternative embodiments of the invention, no material limitations to the scope of the claimed invention are intended. The variants that would be possible from a reading of the present disclosure are too many in number for individual listings herein, though they are understood to be included in the present invention. Exemplary of such included variants, though not solely limiting thereto, is the incorporation of a plurality of stepped surfaces or a continuous but varying curvature which resembles and effects the motion similar to the three discrete generally planar surfaces 14-18 illustrated in the preferred embodiment. Further, features and design alternatives that would be obvious to one of ordinary skill in the art are considered to be incorporated also. The scope of the invention is set forth and particularly described in the claims herein below.

I claim:

1. A decoy fin which produces an oscillatory motion when interacting with fluid moving relative thereto, comprising:
   a unitary body having first and second couplings, and first, second and third generally planar fluid interaction surfaces, said first and second generally planar fluid interaction surfaces angularly offset from each other by an obtuse angle with respect to a first face of said second generally planar fluid interaction surface and said second and third generally planar fluid interaction surfaces angularly offset from each other by an obtuse angle with respect to said first face of said second generally planar fluid interaction surface;
   a first interface defining a generally linear boundary between said first and said second generally planar fluid interaction surfaces and having a first termination adjacent an outer edge of said unitary body and a second termination adjacent an outer edge of said unitary body distal thereto; and
   a second interface defining a generally linear boundary between said second and third generally planar fluid interaction surfaces, said second interface angularly offset from said first interface and having a first termination adjacent an outer edge of said unitary body and a second termination adjacent an outer edge of said unitary body distal thereto and thereby defining a distance along said second generally planar fluid interaction surface between said first interface first termination and said second interface first termination which is smaller than a distance along said second generally planar fluid interaction surface between said first interface second termination and said second interface second termination;

an anchor coupled to first coupling; and an avian decoy coupled to second coupling;

said first coupling formed in said first generally planar fluid interaction surface and located more nearly adjacent to said first interface second termination than said first interface first termination;

said second coupling formed in said third generally planar fluid interaction surface and located more nearly adjacent to said second interface first termination than said second interface second termination.

2. The submersible decoy fin of claim 1, wherein said avian decoy further comprises a duck decoy.

3. The submersible decoy fin of claim 1, wherein said avian decoy further comprises a goose decoy.

4. The submersible decoy fin of claim 1, wherein said fluid further comprises water, and said decoy fin is submersed in said water.

5. The submersible decoy fin of claim 1, wherein said unitary body further comprises reformed sheet stock.

6. The submersible decoy fin of claim 5, wherein said reforming further comprises vacuum thermoforming.

7. The submersible decoy fin of claim 5, wherein said unitary body further comprises a helical geometry which will interact with said fluid to generate a helical flow.

8. In combination, an anchor, an avian decoy, a submersible decoy fin, a first flaccid member coupling said anchor to said submersible decoy fin, and a second flaccid member coupling said submersible decoy fin to said decoy, said submersible decoy fin oscillatory upon interaction with moving water and operative to cyclically oscillate said decoy relative to said anchor during said interaction with moving water, said submersible decoy fin comprising:

a unitary body having first and second couplings, and first, second and third generally planar fluid interaction sections, said second section having first and second major faces on opposed surfaces of said second section, said first and second generally planar fluid interaction sections angularly offset from each other by an obtuse angle with respect to said first major face of said second generally planar fluid interaction section and said second and third generally planar fluid interaction sections angularly offset from each other by an obtuse angle with respect to said first major face of said second generally planar fluid interaction section, a first interface defining a generally linear boundary between said first and said second generally planar fluid interaction sections and having a first termination adjacent an outer edge of said unitary body and a second termination adjacent an outer edge of said unitary body distal thereto; and a second interface defining a generally linear boundary between said second and third generally planar fluid interaction sections, said second interface angularly offset from said first interface and having a first termination adjacent an outer edge of said unitary body and a second termination adjacent an outer edge of said unitary body distal thereto and thereby defining a distance along said second generally planar fluid interaction section between said first interface first termination and said second interface first termination which is smaller than a distance along said second generally planar fluid interaction section between said first interface second termination and said second interface second termination;

said first coupling formed in said first generally planar fluid interaction surface and located more nearly adjacent to said first interface second termination than said first interface first termination;

said second coupling formed in said third generally planar fluid interaction surface and located more nearly adjacent to said second interface first termination than said second interface second termination.

9. The combination anchor, avian decoy, submersible decoy fin, and first and second flaccid members of claim 8, wherein said avian decoy further comprises a duck decoy.

10. The combination anchor, avian decoy, submersible decoy fin, and first and second flaccid members of claim 8, wherein said unitary body further comprises a helical geometry which will interact with said fluid to generate a helical flow.

11. The combination anchor, avian decoy, submersible decoy fin, and first and second flaccid members of claim 8, wherein said unitary body further comprises reformed sheet stock.

12. The combination anchor, avian decoy, submersible decoy fin, and first and second flaccid members of claim 11, wherein said reforming further comprises vacuum thermoforming.

* * * * *